(12) United States Patent
Pu et al.

(10) Patent No.: US 9,294,951 B2
(45) Date of Patent: Mar. 22, 2016

(54) METHOD FOR JOINT CELL MEASUREMENT AND SYSTEM INFORMATION IDENTIFICATION

(71) Applicant: Intel Mobile Communications GmbH, Neubiberg (DE)

(72) Inventors: Tianyan Pu, Dresden (DE); Jun Zhou, Xi'an (CN)

(73) Assignee: Intel Deutschland GmbH, Neubiberg (DE)

( * ) Notice: Subject to any disclaimer, the term of this patent is extended or adjusted under 35 U.S.C. 154(b) by 132 days.

(21) Appl. No.: 13/912,175

(22) Filed: Jun. 6, 2013

(65) Prior Publication Data
US 2014/0364065 A1 Dec. 11, 2014

(51) Int. Cl.
*H04B 17/00* (2015.01)
*H04W 24/10* (2009.01)

(52) U.S. Cl.
CPC .................................. *H04W 24/10* (2013.01)

(58) Field of Classification Search
CPC .................................................. H04B 17/0042
USPC ........................................................ 455/67.11
See application file for complete search history.

(56) References Cited

U.S. PATENT DOCUMENTS

| | | | | |
|---|---|---|---|---|
| 8,509,102 B2 * | 8/2013 | Krishnamurthy | ..... | G01S 5/0221 370/252 |
| 2002/0004400 A1 * | 1/2002 | Fischer | ............... | H04L 27/0012 455/456.5 |
| 2012/0108270 A1 * | 5/2012 | Kazmi | .................. | H04W 64/00 455/456.5 |
| 2012/0231809 A1 * | 9/2012 | Siomina | ................ | H04W 64/00 455/456.1 |
| 2013/0017793 A1 * | 1/2013 | Henttonen | ............ | H04W 52/52 455/63.1 |
| 2013/0079049 A1 * | 3/2013 | Yu | ......................... | H04W 48/16 455/524 |
| 2013/0083753 A1 * | 4/2013 | Lee | ................... | H04W 72/0453 370/329 |
| 2013/0176952 A1 * | 7/2013 | Shin | ....................... | H04L 5/001 370/329 |

* cited by examiner

*Primary Examiner* — April G Gonzales
(74) *Attorney, Agent, or Firm* — Schwegman Lundberg & Woessner, P.A.

(57) ABSTRACT

The present disclosure relates to a method for determining an impact factor of a mobile communication system, wherein reference signals of a detection space defined by an impact factor are examined. Examining in this context refers to trying to detect, hence blindly detect, cell specific reference signals. The detection space is divided into a plurality of subsets, wherein each subset of the plurality of subsets is associated with a specific value of said impact factor. The specific value of said impact factor is identified for which an existence of cell specific reference signals has been detected in the subset associated with said specific value. Thus, the system information defined by a specific value of an impact factor is blindly detected.

22 Claims, 6 Drawing Sheets

METHOD FOR JOINT CELL MEASUREMENT AND SYSTEM INFORMATION IDENTIFICATION

BACKGROUND OF THE INVENTION

Measurement is a fundamental feature for a mobile device in mobile communication systems such as LTE since it enables a mobile device to properly attach or handover to a cell for wireless communication, but also enables a base station to estimate the channel fading and select suitable resource and modulation and coding scheme to fulfill the quality of service (QoS) requirement of mobile devices with reasonable resource. Therefore, accurate measurements constrained by limited time are essential for mobile communications.

Some system information and related configurations will impact the performance of measurement, for example, system or measurement bandwidth, transmit antenna configuration, multicast-broadcast single frequency network (MBSFN) configuration in LTE systems, and uplink/downlink configuration in time division duplex (TDD) systems, etc. This information may be informed to the mobile device by base stations via system information messages sent via a broadcast channel. For a mobile communication system the system information is standardized, for example for an LTE system in 3GPP TS 25.331. However, in some scenarios, system information is unknown to the mobile device when performing measurements, for example, initial cell search/measurements where no system information has yet been decoded, and gap-based neighbor cell search/measurements where the mobile device is connected to a non-LTE based network and is trying to measure the LTE network—in which such system information may or may not be available or accessible to mobile devices.

Without system information knowledge, such as bandwidth, transmit antenna configuration, and uplink/downlink configuration, mobile devices have to turn to a conservative way by assuming a system configuration that corresponds to the minimum system configuration of a specific radio access technology. For example, in an LTE system, the mobile device will assume a 1.4 MHz bandwidth, one transmission antenna, and only subframe 0 and subframe 5 can be used for measurement in case of Time Division Duplex, which is the minimum system configuration of LTE and contains the minimum number of reference subcarriers as disclosed in 3GPP TS 36.211. Since measurement accuracy is highly related to the number of reference subcarriers carrying reference symbols utilized, such a conservative measurement may lead to either a much longer measurement time—which is not allowed in some scenarios and costs power—or performance degradation which may reduce the margin or even not fulfill the requirements of standard. Furthermore, it will be worse if MBSFN information is unknown. In this case, since the mobile device does not know if the measured sub-frame is an MBSFN sub-frame, a performance degradation is unavoidable for a given limited measurement time.

BRIEF DESCRIPTION OF THE DRAWINGS

Reference will be made to the accompanying drawings, wherein.

DETAILED DESCRIPTION OF THE INVENTION

The present disclosure relates to a method for joint cell measurement and system information identification in mobile communication systems. The present disclosure specifically relates to a method for joint cell measurement and system information identification in mobile communication systems based on orthogonal frequency division multiplexing (OFDM).

A method for joint cell measurement and system information identification in a mobile device, specifically in an E-UTRA/LTE UE mobile device, based on blind detection of reference signals, substantially as shown in and/or described in connection with at least one of the figures, as set forth more completely in the claims.

The method is advantageously applicable in a mobile communication system based on OFDM such as LTE systems.

These and other advantages, aspects and novel features of the present disclosure, as well as details of an illustrated embodiment thereof, will be more fully understood from the following description and drawings.

System information of a mobile communication system is defined by impact factors of the mobile communication system such as bandwidth, antenna configuration or sub-frame type. A specific value of an impact factor refers to a specific realization of said impact factor, for example a specific value for the impact factor bandwidth is 1.4 MHz or 20 MHz.

The present disclosure relates to a method for determining an impact factor of a mobile communication system, wherein reference signals of a detection space defined by an impact factor are blindly detected. The detection space is a set of reference signals. The size of the detection space depends on the number of reference signals available for the maximum specific value of an impact factor. The detection space is divided into a plurality of subsets, wherein each subset of the plurality of subsets is associated with a specific value of said impact factor.

In an OFDM system a limited number of subcarriers carry reference signals, in case of LTE cell specific reference signals (CRS), for performing channel estimation. As it is a priori unknown whether in a subset of the detection space subcarriers carrying reference signals exist or not at least one reference signal of a subset is blindly detected. Blindly detecting in this context means a subcarrier in the time-frequency grid possibly carrying a reference signal is examined for whether the subcarrier is carrying a reference signal or not by computing its detection metrics.

The specific value of said impact factor is identified for which an existence of at least one reference signal has been detected in the subset associated with said specific value. Thus, the system information defined by a specific value of an impact factor is blindly detected.

A detection space is said to be complete if it contains all reference signals for an impact factor. In case all the reference signals of a complete detection space are examined, hence blindly detected, dividing the detection space into a plurality of disjunct subsets is equivalent to grouping all the reference signals into the plurality of disjunct subsets. Thus, a subset of the detection space represents a group of reference signals associated with a specific value of an impact factor. Therefore, the terms subset of the detection space or group of reference signals are equivalent.

In a mobile communication system, such as an LTE system, cell specific reference signals (CRS) shall be transmitted in every downlink sub-frame according to the transmission antenna except the MBSFN sub-frame. For the MBSFN sub-frame, cell specific reference signals are only transmitted in a non-MBSFN region.

Detection metrics will be calculated for each subset and compared to pre-defined thresholds. The detection metrics may be but are not only limited to signal to interference noise ratio (SINR), signal to noise ratio (SNR), reference signal received power (RSRP), and reference signal received quality (RSRQ).

Subsets or groups and their associated measurement results may be combined to get the final measurement results. Therefore, subsets of the plurality of subsets can be merged in order to generate a single value of an impact factor.

In case that some of system information can be assumed to be the same, e.g. same system bandwidth and uplink/downlink configuration for neighboring cells in the same band, they can be detected from strongest cell/cells, making detection much easier. Thus, a value of an impact factor of a cell of a plurality of cells of a carrier can be set to the identified specific value of the impact factor of another cell of the plurality of cells for which the specific value of the impact factor has already been identified. Specifically, the value of an impact factor of a cell of a plurality of cells of a carrier can be set to the identified specific value of the impact factor of a strongest cell of the plurality of cells.

In case a priori system information is available, reference signals in a subset associated with a specific value of an impact factor that is a priori known can be directly detected.

In case a plurality of impact factors need to be identified they can be identified successively. Specifically, the order of identification can be bandwidth, antenna configuration and sub-frame type.

The present disclosure further relates to a mobile device. The mobile device comprises means for dividing a detection space defined by an impact factor into a plurality of subsets, wherein each subset of the plurality of subsets is associated with a specific value of the impact factor. The mobile device further comprises means for blindly detecting at least one reference signal of the detection space and means for identifying the specific value of the impact factor upon detecting an existence of the at least one reference signal in the subset associated with the specific value. Said means may be part of a module normally employed for cell measurement.

Figure 1:
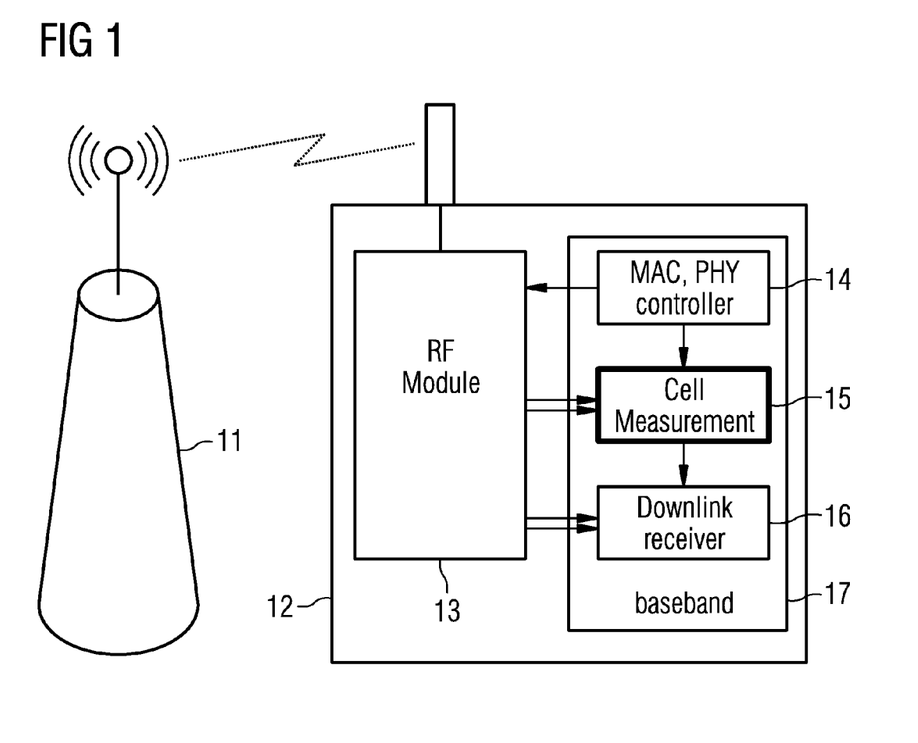
FIG. 1 shows a block diagram of a mobile communication system.

FIG. 1 shows a block diagram of a mobile communication system comprising a base station 11 and a mobile device 12. The mobile device comprises a radio frequency (RF) module 13 for obtaining radio samples and a baseband module 17 for performing baseband processing on the radio samples. The baseband module may comprise a media access control (MAC) and physical (PHY) layer controller 14, a cell measurement module 15 and downlink receiver module 16. The MAC controller 14 controls the RF module as well as the baseband module 17. The MAC, PHY controller 14 may provide a priori known system information to the cell measurement module 15 and the downlink receiver 16.

The mobile communication channel between the base station 11 and the mobile device 12 is indicated by a dotted line.

The channel needs to be estimated for performing symbol detection in the downlink receiver 16. For this purpose reference signals being multiplexed into the time-frequency grid of an OFDM system are employed to perform channel estimation and RSRP/RSRQ measurement at the mobile device 12. For an LTE system the distribution of cell specific reference signals in the time-frequency grid is specified in 3GPP TS 36.211. The number of reference signals available depends on the configuration of the mobile communication system. The configuration is given by the specific values of impact factors.

For example, in an LTE system the number of reference signals available within a sub-frame depends on the impact factors system bandwidth, number of transmit antennas and sub-frame type (i.e. downlink/uplink, special, and MBSFN sub-frame). With conservative cell measurement based on a minimum configuration of the LTE system, the mobile device would select a minimum set of CRS, which must be present regardless of the system settings except MBSFN sub-frame. For example, the mobile device would select CRS located at TX antenna 0 and within the center 1.4 MHz frequency bandwidth if the TX antenna number and system bandwidth are unknown, since these CRS must be transmitted by any 3GPP-compliant LTE base station (eNodeB). For a time division duplex (TDD) system, the mobile device would only use sub-frame 0 and 5 for measurement if UL/DL configuration is unknown. However, such a conservative way sacrifices either measurement time or measurement accuracy as it can be assumed that by taking into account a larger number of CRS will lead to either better measurement accuracy or shortened measurement time. For example, if a frequency division duplex (FDD) eNodeB deploys 10 MHz with dual TX antennas, only 6% of all available CRS is utilized with such a conservative measurement approach when system bandwidth and TX antenna configuration are unknown to UE.

To make use of all available reference signals independently of the availability of a priori information regarding the system configuration, the method for determining an impact factor of a mobile communication system is based on blindly detecting the reference signals. The method may be implemented by the cell measurement module 15. The cell measurement module 15 may therefore be configured to blindly detect at least one reference signal of a subset of a detection space, said detection space being a subspace of a set of radio samples obtained by the radio frequency module 13. The detection space is divided into a plurality of subsets, each subset being associated with a specific value of an impact factor. The cell measurement module 15 may be further configured to identify the specific value of an impact factor upon detecting an existence of the at least one reference signal in the subset associated with the specific value.

The identified specific value of an impact factor may be provided by the cell measurement module 15 to the downlink receiver module 16. Therefore, the downlink receiver module 16 does not need to decode the system information itself.

The system configuration given by the identified specific value of an impact factor can be used in the cell measurement module 15 for performing superior cell measurements by taking into account a larger number of reference signals depending on the identified system configuration in comparison to conservative cell measurements based on a minimum set of reference signals that corresponds to a minimum configuration of the mobile communication system.

With LTE, three factors need to be detected, including bandwidth, TX antenna configuration, and sub-frame type (uplink sub-frame, downlink non-MBSFN sub-frame, downlink MBSFN sub-frame, and downlink/uplink switch subframe). For other mobile communication systems based on OFDM, other factors may need to be detected.

The detection space may not be large in a mobile communication system. For example, in an LTE system there are 6 possible bandwidth types and 4 possible TX antenna configurations in frequency division duplex (FDD) systems. In time division duplex (TDD) systems, additionally 3 possible sub-frame types need to be detected. These factors could be known or unknown by the mobile device due to a priori decoded system information. Preferably, only the unknown factors are detected while the known factors are directly applied into the measurement procedure.

For example, if the CRS in TX antenna 0 group and TX antenna 1 group are detected, which means the detection metric is greater than or equal to the given threshold, the TX antenna number can be identified to be 2. Subsets and their associated measurement results may be combined to get the final measurement results according to the detected system information. To simplify the explanation, the method is disclosed with SINR as the detection metric, although other detection metrics (e.g. SNR, RSRP and RSRQ) or combination of them can also be used.

Figure 2:
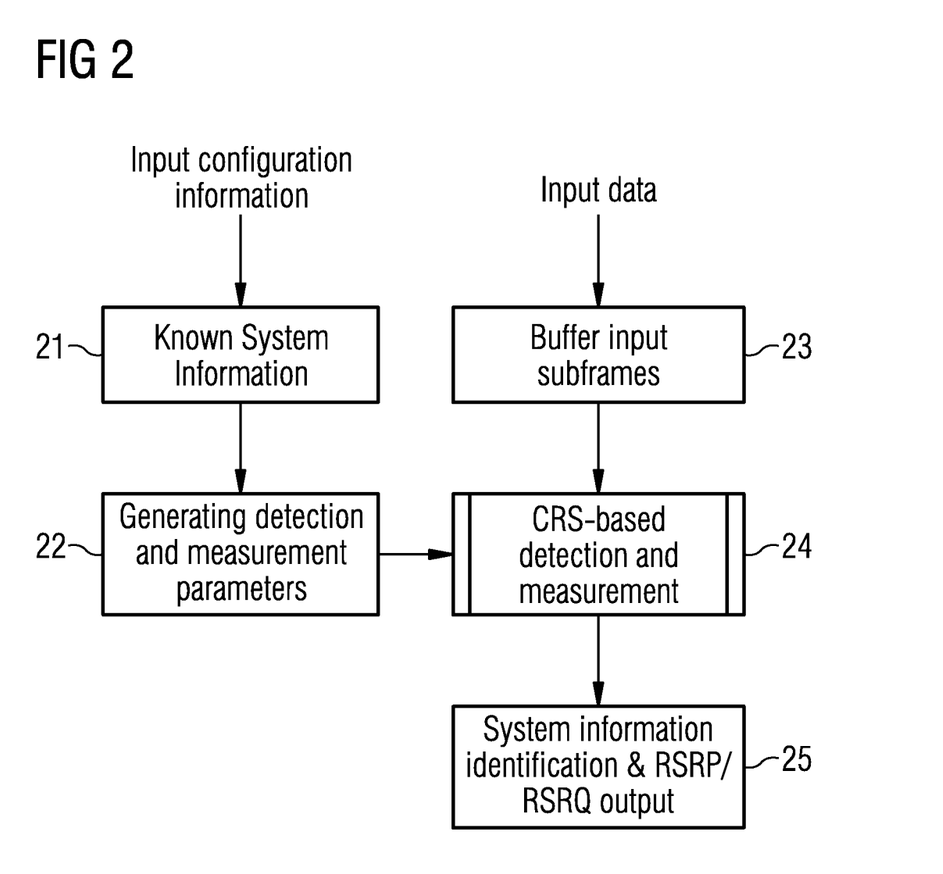
FIG. 2 shows a block diagram of a joint measurement and system information identification scheme.

Referring to FIG. 2, the method for determining an impact factor can be described as follows.

Before the measurement and detection processing, the mobile device obtains the known system information from the input configuration messages which come from higher layer, see MAC and PHY layer control 14 in FIG. 1, as shown in block 21 in FIG. 2. With respect to the known system information several scenarios appear likely. It is possible that some of the impact factors or all the impact factors are known or unknown.

For unknown impact factors, the higher layer may indicate if these factors need to be detected. The unknown impact factor may be set by the higher layer to its value corresponding to the minimum system configuration. For example, if the bandwidth is unknown, the higher layer can set the bandwidth as N6 (1.4 MHz) if detecting is not needed. In this case, the measurement model even does not know the bandwidth factor is unknown.

It is also possible that although there is no exact value for impact factors, a set of values can be given for a certain factor. For example, the uplink/downlink configuration can be set as 0, 1, 2, and 3. Also, the bandwidth can be set as a range, such as greater than or equal to 10 MHz, alternatively less than 10 MHz.

Any other information which is necessary for CRS-based detection and measurement, including but not limited to TDD or FDD, normal or extended CP (cyclic prefix), the resource (sub-frames, OFDM symbols) used for each kind of detection, averaging configuration for detection and measurement, the detection strategy, the resource (sub-frames) used for measurement, the thresholds used for each kind of detection, timing offset for processing are provided in block 21: known system information.

As shown in block 22, detection and measurement parameters are generated and set. At first, the known impact factor is set. Then, unknown factors that need not be detected are set to the value corresponding to the minimum system configuration. Bandwidth is set to 1.4 MHz; number of TX antennas is set to only one antenna; sub-frame type is set to sub-frame 0 and sub-frame 5 as normal downlink sub-frame without considering MBSFN sub-frame. Then, unknown impact factors are set to "UNKNOWN" state, and this means that related CRS will be calculated and these factors will be blindly detected and reported during the processing.

Input data (radio samples) is received and an input sub-frame is buffered in block 23. Subsequently, CRS-based detection and measurement is then performed according to the configuration and parameters as shown in block 24. The detailed procedure will be discussed in following subsections.

Finally, measurement and detection results like system information ID and RSRP/RSRQ outputs are reported as shown in block 25.

The processing blocks shown in FIG. 2 may be part of the cell measurement module 15 as shown in FIG. 1. Input data is received from the RF module 13 and a priori information from the MAC/PHY controller 14 as shown in FIG. 1.

In the following subsections, single unknown impact factor scenarios are presented and then extended to a scenario where multiple impact factors are unknown.

In a single impact-factor unknown scenario, it is assumed that only one factor is in "UNKNOWN" state. The impact factors for the single impact-factor unknown scenario include measurement bandwidth, sub-frame type, and TX antenna configuration.

Figure 3:
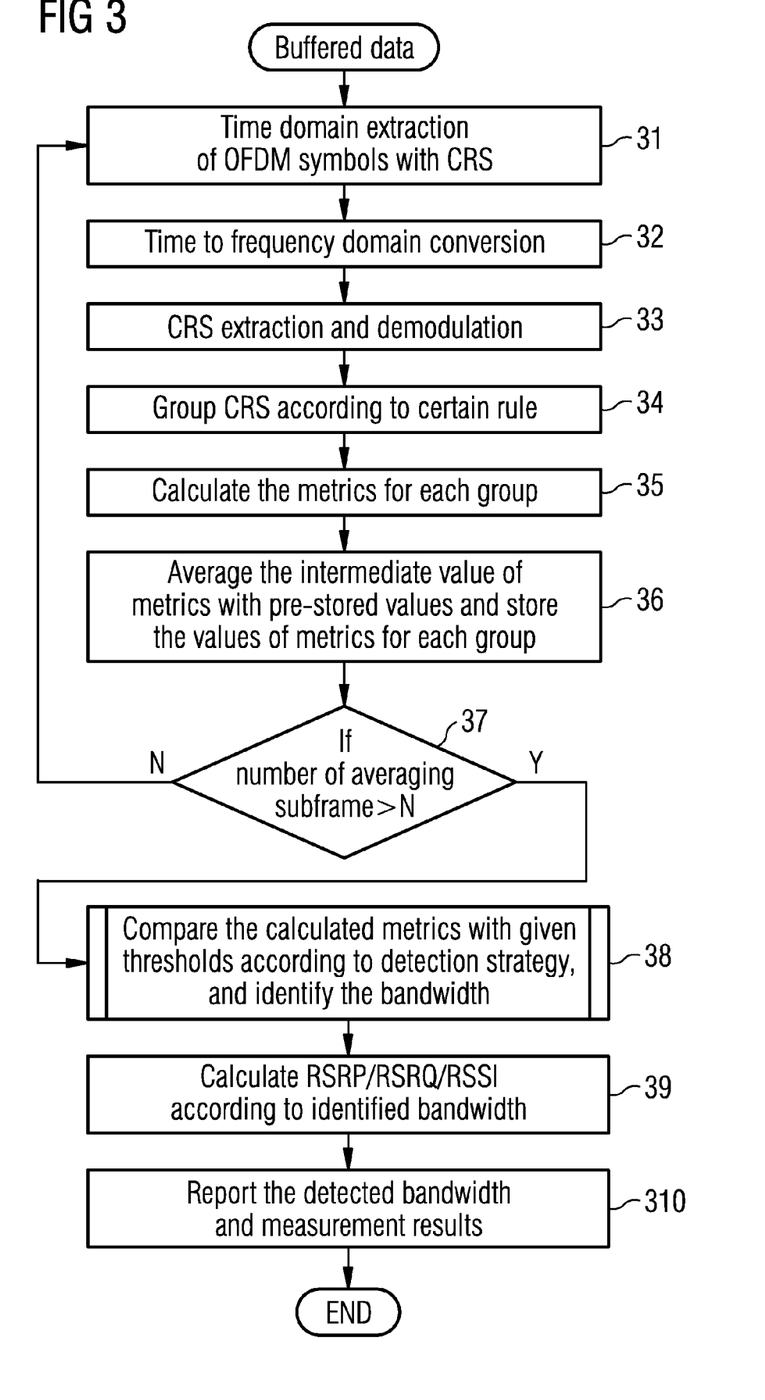
FIG. 3 shows a flow chart for a single impact factor scenario—bandwidth.

A flow chart of an exemplary method of an unknown bandwidth scenario is shown in FIG. 3 and the detailed steps are described as follows:

Time domain OFDM symbols of buffered data which include CRS are extracted, as shown in block 31.

The input sub-frame is sampled assuming the highest bandwidth a measurement receiver can handle or the possible maximum bandwidth configured by higher layer. The extraction in time domain shall consider the sub-frame type, and only downlink sub-frames shall be included.

After time domain extraction of OFDM symbols containing CRS, the symbols are converted into the frequency domain as shown in block 32. Then, cell specific reference signals are extracted according to the TX antenna configuration and maximum possible bandwidth, see block 33. The CRS are divided into several subsets or groups, as shown in block 34, according to the following rules. Two kinds of strategies to group the CRS are proposed.

As a first strategy, subcarriers within center K MHz but not L MHz are put into the $M^{th}$ group. The K, L and M values are listed in the following table. The center bandwidth K corresponds to the maximum possible bandwidth of subset with its center at a specific center frequency.

Hence, a subset M is defined by its center bandwidth K(M) and exclusion bandwidth L(M), the subset comprising reference signals in a range between its center bandwidth K(M) and exclusion bandwidth L (M), wherein the exclusion bandwidth L(M) corresponds to the center bandwidth K (M−1) of another subset (M−1). The exclusion bandwidth L(1) of the subset M=1 corresponding to the minimum system configuration is zero MHz.

As a second strategy, subcarriers within center K MHz are put into the $M^{th}$ group. Hence, a subset of the detection space is defined merely by its center bandwidth. Thus, subsets overlap.

| M | K | L |
|---|-----|-----|
| 1 | 1.4 | 0 |
| 2 | 3 | 1.4 |
| 3 | 5 | 3 |
| 4 | 10 | 5 |
| 5 | 15 | 10 |
| 6 | 20 | 15 |

Figure 4:
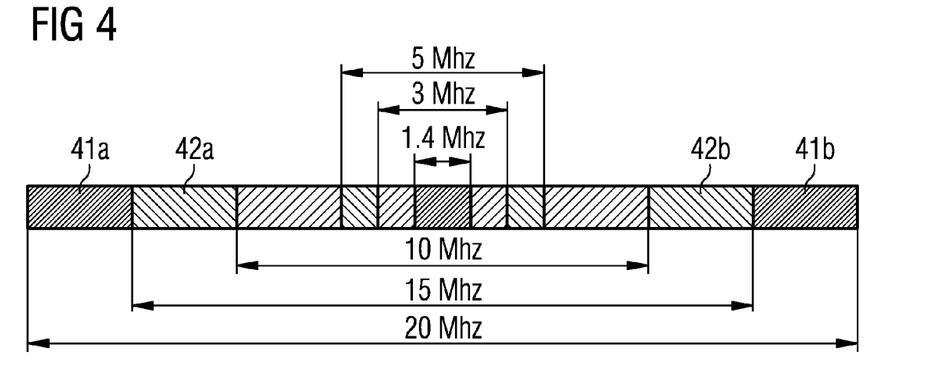
FIG. 4 shows a diagram of a subcarrier grouping in case of unknown bandwidth.

FIG. 4 shows a diagram of a subcarrier grouping in case of unknown bandwidth according to the first strategy. Thus, the detection space of CRS subcarriers is divided into a plurality of disjunct subsets. Each subset corresponds to a value of the impact factor bandwidth. For example, for the 20 MHz bandwidth the corresponding subset is indicated by labels 41a and 41b, for the 15 MHz bandwidth the subset is indicated by labels 42a and 42b. The maximum number of subsets is 6 in this example.

Generally, the number of subsets shall be calculated according to the possible maximum bandwidth. For example, when maximum possible bandwidth is 10 MHz, the bandwidth shall be divided into 4 subsets.

Returning to FIG. 3, the detection metrics for each subset or group are calculated, see block 35. Then, the intermediate metrics values are averaged with corresponding pre-stored values and the results are stored as shown in block 36. In case there is no pre-stored value, the results are stored directly. If the number of averaging sub-frames is larger than a pre-defined value N, the method is continued at block 38; otherwise at block 39; see decision block 37. The calculated metrics are compared with a given threshold according to the detection strategy, and the bandwidth is identified. RSRP/RSRQ/RSSI results according to the identified bandwidth are calculated, see block 39. Finally, the detected bandwidth and the measurement results are reported, see block 210.

Two kinds of detection strategies are proposed, one is to compare the metrics from wide bandwidth to narrow bandwidth; the other one is vice versa.

Figure 5:
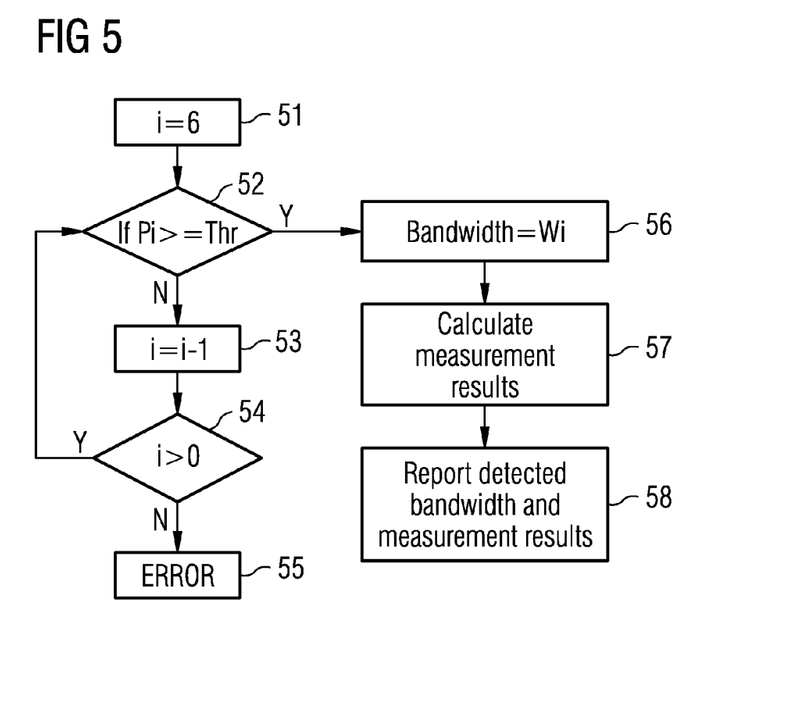
FIG. 5 shows a flow chart for bandwidth detection for a single cell.

An example for the first strategy for a possible maximum bandwidth of 20 MHz is shown in FIG. 5.

Assume that the metric value for group i is Pi, the subset or group i defined as described above, and the threshold is Tr. Define Wi is the bandwidth corresponding to Pi;

Set an initial value, for example, i=6 (maximum possible bandwidth is 20 MHz), see block 51.

Compare Pi against Thr, see block 52. If Pi is greater than or equal to/greater than Thr, then continue at block 56; else set i=i−1, and repeat block 52 until i=0. In this example, when the value of metric is greater than or equal to/greater than Thr, CRS is found. These metrics may include but not limit to SINR, SNR, RSRP, and RSRQ. However, for other metrics, for example, SINR, RSRP, etc., when value of metric is less than or equal to/less than Thr, CRS is found.

If i>0, the detected bandwidth is Wi, see block 56, else the detected bandwidth is set to "ERROR", see block 55.

If the detected bandwidth is not "ERROR", the RSRP/RSRQ/RSSI results according to the identified bandwidth are calculated, see block 57. Finally, the detected bandwidth and the measurement results are reported, see block 58. In case of "ERROR", the smallest bandwidth may be assumed. Even though no specific bandwidth could be blindly detected in this case, it is still safe to assume the smallest bandwidth in this case.

Instead of assuming a minimum number of CRS as in the conservative approach, the system may be designed with the maximum number of CRS possibly available when bandwidth is unknown to the mobile device. This means that the highest bandwidth a measurement receiver can handle is assumed, for example, 20 MHz. CRS are divided into several subsets or groups according to a certain rule and the detection metrics are calculated. These metrics are compared with a given threshold according to some predefined method and the actual bandwidth can be identified and measurement results can be reported.

Usually the spectrum is allocated to one network user (operator) only. It is highly likely that the cells occupying the same frequency carriers have the same bandwidth.

Therefore, for multiple cell detection and measurement scenarios, if one cell's bandwidth, possibly the strongest cell, in a carrier has been detected, the bandwidth of any other cells in the same carrier can be set as the bandwidth detected with the assumption that all cells have the same bandwidth. This will improve the detection reliability for a weak cell while reducing the computational complexity. The other cells on the same frequency carrier can use the bandwidth as their measurement bandwidth.

Alternatively, the detection reliability may be improved by averaging the value of metric across all detected cells for each group, and then comparing the metrics against the given threshold according to the detection strategy. This may increase the performance of detection at the cost of computational complexity increase.

Moreover, another method to calculate an averaged SINR is to use averaged RSRP and RSSI.

$$\overline{SINR_k} = 10 * \log10\left(\frac{\overline{RSRP_k}}{\overline{RSSI_k} - \overline{RSRP_k}}\right)$$

The averaged SINR in dB is equivalent to the logarithm of the averaged RSRP divided by the difference of the averaged RSSI and the averaged RSRP.

The bandwidth information for carriers which have already been detected may also be stored in the mobile device and be reused for further processing. This information may be regularly updated. If this assumption is not valid, the bandwidth needs to be detected separately for multiple cell detection scenarios.

The assumption of all cells in one carrier having the same bandwidth may be set according to the information conveyed from a base station by configuration information. For example, a field named "bandwidth_configuration", may be used. If "bandwidth_configuration=SAME", all the cells in the same frequency carrier have the same bandwidth; if "bandwidth_configuration=INDEPENDENT", the cells in the same frequency carrier may have a different bandwidth.

Next, a scenario is described in which it is assumed that only TX antenna configuration is unknown for mobile devices. Since the bandwidth is already known, a suitable sampling rate is selected, not necessarily always the maximum value, and the CRS within pre-defined bandwidth are extracted.

Figure 6:
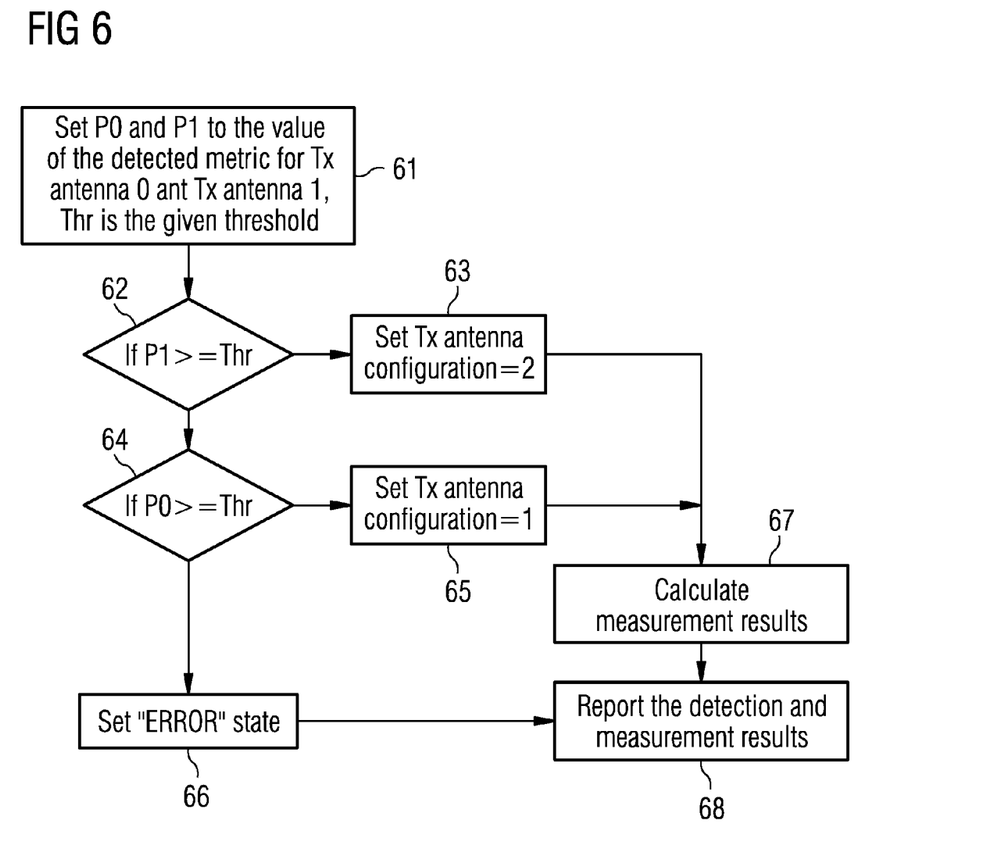
FIG. 6 shows a flow chart for TX antenna configuration detection for a single cell.

A similar procedure as employed for the unknown bandwidth scenario is used, as shown in FIG. 6. The difference compared to bandwidth detection is that the CRS is divided into two subsets or groups, one for TX antenna 0, and the other for TX antenna 1.

Furthermore, the detection strategy for TX antenna configuration is easier compared to the detection strategy for bandwidth detection since there are only two groups. The principle is that if TX antenna 1 exists, TX antenna 0 shall also exist. The detailed steps are shown below with reference to FIG. 6:

Assume that P0 and P1 are the calculated metrics for TX antenna 0 and TX antenna 1 respectively; Thr is the threshold, see block 61.

Compare the P1 with threshold, see reference 62. If reference signals are detected, then there are two TX antennas, see block 63. In this case continue at block 67. Otherwise continue at block 64.

In case reference signals have not been detected in block 62, compare the P0 with threshold, see block 64. If reference signals are detected, then there is one TX antennas, see reference 65, otherwise set "ERROR" state, see block 66.

In case one antenna or two antennas have been identified, calculate the measurement results according to TX antenna configuration, see block 67.

Report measurement results and detected TX antenna configuration results, see block 68.

The method for determining the antenna configuration in a single cell scenario can be summarized as follows. A first subset of CRS is associated with a first antenna and a second subset of CRS is associated with a second antenna. The CRS of the detection space defined by the first antenna and the second antenna are blindly detected. In case the second antenna could be identified, then it is assumed that both the first and second antennas exist. In case the second antenna could not be identified, then it is assumed that only the first antenna exists.

Base stations in one network are highly likely to have the same number of antennas. Therefore, it is assumed that cells occupying the same carrier shall have the same TX antenna configuration. As for the bandwidth detection, with this assumption, methods for multiple cells TX antenna configuration detection are proposed:

1) If one cell's TX antenna configuration is already detected which is usually the strongest cell, all other cells in the same carrier are set to the same TX antenna configuration.
2) The detection metric is averaged across all cells in the same carrier for each antenna and the averaging values are compared against the predefined threshold. For SINR metric, the averaged value can be calculated using the equation above.

If this assumption is not valid, the TX antenna configuration needs to be detected separately in multiple-cell detection scenarios.

The assumption that all cells in one carrier have the same TX configuration can be determined from configuration information. For example, a field named "TX_configuration", which can be included in the system information which is transmitted by a base station can be used. If "TX_configuration=SAME", all the cells in the same frequency carrier have the same TX antenna configuration; if "TX_configuration=INDEPENDENT", the cells in same frequency carrier may have different TX antenna configuration.

The TX antenna configuration for carriers which have already been detected may also be stored in the mobile device and be reused later. This information may be regularly updated.

The following subsection refers to a scenario where it is assumed that only sub-frame type is unknown to the mobile device. Basically, there are four types of sub-frames, including normal downlink sub-frame, downlink MSBFN sub-frame, uplink-sub-frame, and special sub-frame.

A similar method as described for the unknown bandwidth scenario as shown in FIG. 3 is used for sub-frame type detection. The key point for this scenario still is how to group the CRS. There are several possible ways to perform sub-frame grouping. One way is based on sub-frame index. If the sub-frame type is unknown to the mobile device, each sub-frame within one radio frame is put into a separate group so that in total 10 groups are formed per radio frame. A straightforward enhancement is to merge some of these 10 groups using pre-known knowledge at the mobile. For example in TDD case, sub-frame 0 and 5 are for sure downlink sub-frames. Therefore, group 0 and 5 can be merged into one so that only 9 groups (instead of 10 groups) are formed. Furthermore, since the sub-frame with k*10 ms distance shall be the same sub-frame type if it is not MBSFN sub-frame, these sub-frames could be included in one group.

Two detection strategies are proposed for this scenario. The first one is similar to the previous scenarios. If the value of the detected metric is greater than or equal to the given threshold, it is assumed that the sub-frame is a normal downlink sub-frame. Otherwise, the sub-frame is assumed not to be a normal downlink sub-frame.

The second detection strategy is a two-threshold based method in order to provide more information for future processing—described as below:

1. If the value of the detected metric is greater than or equal to the given threshold Thr1, it is a normal downlink; else continue;
2. If the value of detected metric is less than or equal to the given threshold Thr2, it is a uplink sub-frame; else continue;
3. It is neither a normal downlink sub-frame, nor an uplink sub-frame.

Hence, a normal downlink sub-frame type is identified when a detection metric exceeds or is equal to a first threshold, and wherein an uplink sub-frame type is identified when the detection metric is less than or equal to a second threshold.

In multiple-cell detection scenarios, two strategies are given as below.

1) Assume that all cells occupying one carrier have the same downlink sub-frame pattern. In this case, the two methods discussed in previous subsection can be used—one is using one detected results for all cells in the same carriers; and the other is averaging the detection metric across all cells in the same carrier for each group.
2) Assume that downlink sub-frame patterns of cells occupying one carrier are independent. Therefore, the detection needs to be performed for each cell.

The assumption that all cells in one carrier have the same sub-frame pattern could be set by configuration information. For example, a field named "sub-frame_pattern", could be used. If "sub-frame_pattern=SAME", all the cells in the same frequency carrier have the same sub-frame pattern; if "sub-frame_pattern=INDEPENDENT", the cells in the same frequency carrier may have different sub-frame patterns.

The following subsection refers to multiple scenarios of multiple unknown impact factors. In a mobile communication system such as LTE system, a maximum of three impact factors i.e. system/measurement bandwidth, TX antenna number, sub-frame type or boundary may be unknown to the mobile device. For other mobile communication systems the number of impact factors maybe other than three. Each impact factor leads to one dimension during subcarrier grouping. Therefore, depending on the number of unknown parameters, subcarrier grouping can be a 1-D or 2-D or 3-D problem in implementation, i.e. a problem in multiple dimensions where each dimension represents one specific unknown parameter.

Figure 7:
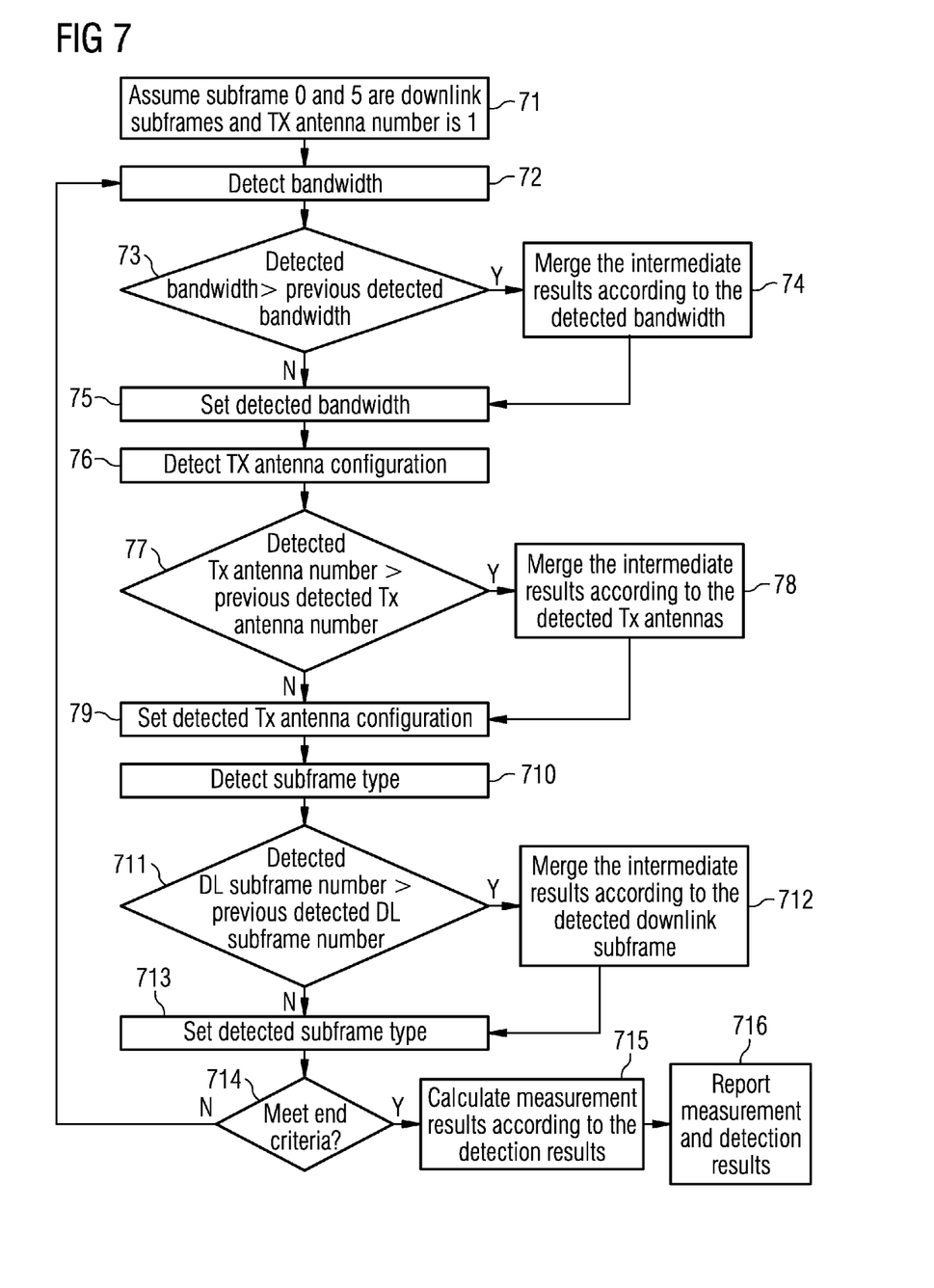
FIG. 7 shows a flow chart for a triple impact factor scenario—bandwidth, antenna configuration and sub-frame type.

1-D grouping for each impact factor has already been discussed in previous subsection. In case of 2-D grouping or 3-D grouping, impact factor detection in several dimensions can help each other in an iterative way. Once one impact factor is detected, subsets or groups can be merged and the intermediate results can be combined. Note that subsets or groups are split according to multiple dimensions. This may lead to a subdivision into several groups or subsets. E.g. for 2-D, according to one parameter the CRS may be grouped into 3 subsets and according to the other parameter in 3 subsets. This may give a total of 3*4=12 subsets that need to be configured and for which measurements have to be done. Once one parameter is determined, these 12 subsets can be merged into 3 or 4 subsets as for the 1-D case. The benefits of group merge and intermediate result combing is to further average out noise and interference effect, making detection of another impact factor more reliable. FIG. 7 shows an example for the 3-D grouping case. The detailed steps are described as follows:

It is assumed that the only sub-frame 0 and sub-frame 5 are normal downlink sub-frames. Furthermore, it is assumed that only one TX antenna is present, see block 71.

The bandwidth is detected, see block 72.

If the detected bandwidth is wider than the previous detected bandwidth, see block 73, intermediate results according to the detected bandwidth are merged, see block 74. For the first iteration, the previous detected bandwidth is set to 1.4 MHz.

The detected bandwidth is set, see block 75.

Then, the TX antenna configuration is detected, see block 76.

If the detected number of TX antennas is larger than the previous number of detected TX antennas, see block 77, intermediate results according to the detected number of TX antennas are merged, see block 78. For the first iteration, the previous detected TX antenna number is assumed to be 1.

The detected TX antenna configuration is set, see block 79.

Then, the sub-frame type is detected, see block 710.

If more than one downlink sub-frame is detected compared to the previous results, see block 711, the intermediate results according to the sub-frame type detection results are merged, see block 712. For the first iteration, only sub-frame 0 and 5 are downlink sub-frames.

The detected sub-frame type is set, see block 713,

If the end criteria, see block 714, are met, the algorithm is continued at block 715, otherwise at block 72.

The end criteria may be:

a) There is no change compared to previous detection results. For the first iteration, the previous detection results for bandwidth is 1.4 MHz, for TX antenna number is 1, and only sub-frame 0 and sub-frame 5 are assumed to be downlink sub-frames.

b) The maximum values of detected parameters have already met. For example, for bandwidth, it is 20 MHz; for Tx antenna number, it is 2; and all sub-frames are downlink sub-frames.

c) A pre-defined maximum iteration number has been reached.

d) The Accuracy is deemed to be sufficient already with the utilized set of CRS, i.e. there is no incentive any more to try to use even more CRS.

In case the end criteria are met measurement results are calculated according to detected impact factors, see block 715.

Finally, the detection and measurement results are reported, see block 716.

Note that this is just an example for one kind of 3-D cases, wherein impact factors of plurality of impact factors are identified successively. In this example, the detection order is set as bandwidth, TX antenna configuration, and sub-frame type. Any other detection order can also be used. The 2-D case is just a simplified version of 3-D case. The same procedure is used, but the known impact factor is preset, and the corresponding detection procedure is omitted. Also any detection order is possible in 2-D case.

The present disclosure further relates to a computer-readable medium having computer-executable instructions for performing the method as described above.

Aspects of the present disclosure relate to improved measurement time, improved reliability of system information detection as well as reduction in computational complexity.

First of all, measurement accuracy in many scenarios can be significantly improved compared to a conventional conservative method. Secondly, the measurement time is reduced because more resources may be used for measurements, and this may indicate the reduction of power consumption at the mobile device—which usually is critical factor. Furthermore, unknown system information can be detected reliably, and this information may serve as a prior information and benefit other decoding procedures at the mobile device—reduce the computational complexity and/or timing delay. Moreover, the implementation complexity of the disclosed method is reasonable both in terms of calculation and storage requirement. Last but not least, the disclosed method and system are easy to implement.

What is claimed is:

1. A method for determining an impact factor of a mobile communication system comprising:
   dividing a detection space defined by an impact factor into a plurality of subsets, wherein each subset of the plurality of subsets is associated with a specific value of the impact factor;
   blindly detecting at least one reference signal of the detection space; and
   identifying the specific value of the impact factor upon detecting an existence of the at least one reference signal in the subset associated with the specific value,
   wherein the impact factor is at least an antenna configuration
   wherein the detection space is defined by a maximum number of antennas; and
   wherein a first subset is associated with a first antenna and a second subset is associated with a second antenna; and
   wherein in case the second antenna could be identified, then it is assumed that both the first and second antennas exist, and in case the second antenna could not be identified, then it is assumed that only the first antenna exists.

2. The method according to claim 1, wherein blindly detecting the at least one reference signal comprises computing detection metrics and comparing the detection metrics against a threshold according to a detection strategy.

3. The method according to claim 1, further comprising blindly detecting a plurality of reference signals of a complete detection space;
   grouping the reference signals of the plurality of reference signals to subsets of the plurality of subsets; and
   identifying the specific value of the impact factor upon detecting an existence of reference signals in the subset associated with the specific value.

4. The method according to claim 1, further comprising setting a value of an impact factor of a cell of a plurality of cells of a carrier to the identified specific value of the impact factor of another cell of the plurality of cells for which the specific value of the impact factor has been identified.

5. The method according to claim 1, further comprising setting the value of an impact factor of a cell of a plurality of cells of a carrier to the identified specific value of the impact factor of a strongest cell of the plurality of cells.

6. The method according to claim 1, wherein blindly detecting the at least one reference signal comprises computing detection metrics of all detected cells and averaging the detection metrics across all detected cells for each subset of the plurality of subsets, and comparing the metrics against a given threshold according to a detection strategy.

7. The method according to claim 6, wherein the detection metric is a signal to interference noise ratio and wherein the method comprises computing an averaged signal to interference noise ratio from an averaged reference signal received power and an averaged received signal strength indication.

8. The method according to claim 1, wherein the method comprises directly detecting at least one reference signal in a subset associated with a specific value of an impact factor that is a priori known.

9. The method according to claim 1, wherein the detection space is divided into a plurality of disjunct subsets.

10. The method according to claim 1, the method comprising
merging subsets of the plurality of subsets for generating a single value of an impact factor.

11. The method according to claim 1, wherein impact factors of a plurality of impact factors are identified successively.

12. The method according to claim 11, wherein a first impact factor is antenna configuration, a second impact factor is bandwidth, and a third impact factor is sub-frame type and wherein the first, second and third impact factors are identified successively.

13. A mobile device comprising:
a cell measurement module configured to divide a detection space defined by an impact factor into a plurality of subsets, wherein each subset of the plurality of subsets is associated with a specific value of the impact factor;
to blindly detect at least one reference signal of the detection space; and
to identify the specific value of the impact factor upon detecting an existence of the at least one reference signal in the subset associated with the specific value,
wherein the impact factor is an antenna configuration, and
wherein the detection space is defined by a maximum number of antennas; and
wherein a first subset is associated with a first antenna and a second subset is associated with a second antenna; and
wherein in case the second antenna could be identified, then it is assumed that both the first and second antennas exist, and in case the second antenna could not be identified, then it is assumed that only the first antenna exists.

14. A mobile device comprising:
a radio frequency module for obtaining a set of radio samples;
a cell measurement module being configured to performing cell measurement on the set of radio samples;
the cell measurement module being further configured to blindly detected at least one reference signal of a subset of the detection space being a subspace of the set of radio samples, wherein the detection space is divided into a plurality of subsets, each subset being associated with a specific value of an impact factor;
the cell measurement module being further configured to identify the specific value of the impact factor upon detecting an existence of the at least one reference signal in the subset associated with the specific value,
wherein the impact factor is a bandwidth and wherein a subset is defined by its center bandwidth and exclusion bandwidth, the subset comprising reference signals in a range between its center bandwidth and exclusion bandwidth, wherein the exclusion bandwidth corresponds to the center bandwidth of another subset, and wherein the exclusion bandwidth of the subset corresponding to a minimum system configuration is zero.

15. The mobile device according to claim 14, further comprising:
a downlink receiver, the cell measurement being further configured to provide a specific value of an impact factor to the downlink receiver.

16. The mobile device according to claim 14, the cell measurement being further configured to setting a value of an impact factor of a cell of a plurality of cells of a carrier to the identified specific value of the impact factor of another cell of the plurality of cells for which the specific value of the impact factor has been identified.

17. A non-transitory computer-readable medium having computer-executable instructions for performing the method recited in claim 1.

18. A mobile device comprising:
a radio frequency module for obtaining a set of radio samples;
a cell measurement module being configured to performing cell measurement on the set of radio samples;
the cell measurement module being further configured to blindly detected at least one reference signal of a subset of the detection space being a subspace of the set of radio samples, wherein the detection space is divided into a plurality of subsets, each subset being associated with a specific value of an impact factor;
the cell measurement module being further configured to identify the specific value of the impact factor upon detecting an existence of the at least one reference signal in the subset associated with the specific value,
wherein the impact factor is a sub-frame type,
wherein a subset is associated with a sub-frame index; and
wherein a normal downlink sub-frame type is identified when a detection metric exceeds or is equal to a first threshold, and wherein an uplink sub-frame type is identified when the detection metric is less than or equal to a second threshold.

19. A method for determining an impact factor of a mobile communication system comprising:
dividing a detection space defined by an impact factor into a plurality of subsets, wherein each subset of the plurality of subsets is associated with a specific value of the impact factor;
blindly detecting at least one reference signal of the detection space; and
identifying the specific value of the impact factor upon detecting an existence of the at least one reference signal in the subset associated with the specific value,
wherein the impact factor is bandwidth and wherein a subset is defined by its center bandwidth and exclusion bandwidth, the subset comprising reference signals in a range between its center bandwidth and exclusion bandwidth, wherein the exclusion bandwidth corresponds to the center bandwidth of another subset, and wherein the exclusion bandwidth of the subset corresponding to a minimum system configuration is zero.

20. A non-transitory computer-readable medium having computer-executable instructions for performing the method recited in claim 19.

21. A method for determining an impact factor of a mobile communication system comprising:
dividing a detection space defined by an impact factor into a plurality of subsets, wherein each subset of the plurality of subsets is associated with a specific value of the impact factor;

blindly detecting at least one reference signal of the detection space; and identifying the specific value of the impact factor upon detecting an existence of the at least one reference signal in the subset associated with the specific value, wherein the impact factor is a sub-frame type, wherein a subset is associated with a sub-frame index; and wherein a normal downlink sub-frame type is identified when a detection metric exceeds or is equal to a first threshold, and wherein an uplink sub-frame type is identified when the detection metric is less than or equal to a second threshold.

22. A non-transitory computer-readable medium having computer-executable instructions for performing the method recited in claim 21.

* * * * *